United States Patent
Schübel et al.

(10) Patent No.: US 7,704,586 B2
(45) Date of Patent: Apr. 27, 2010

(54) PLASTIC MOLDED BODIES HAVING TWO-DIMENSIONAL AND THREE-DIMENSIONAL IMAGE STRUCTURES PRODUCED THROUGH LASER SUBSURFACE ENGRAVING

(75) Inventors: Klaus-Dieter Schübel, Recklinghausen (DE); Jürgen Kreutz, Marl (DE); Wilhelm Wolff, Aachen (DE); Günther Ittmann, Gross-Umstadt (DE); Thomas Hasskerl, Kronberg (DE); Harald Häger, Freigericht (DE); Ralf Richter, Hanau-Grossauheim (DE); Wolfgang Stuber, Udenheim (DE)

(73) Assignee: Degussa AG, Dusseldorf (DE)

( * ) Notice: Subject to any disclaimer, the term of this patent is extended or adjusted under 35 U.S.C. 154(b) by 68 days.

(21) Appl. No.: 11/368,602

(22) Filed: Mar. 7, 2006

(65) Prior Publication Data

US 2006/0216441 A1    Sep. 28, 2006

Related U.S. Application Data

(60) Provisional application No. 60/705,500, filed on Aug. 5, 2005.

(30) Foreign Application Priority Data

Mar. 9, 2005    (DE) ...................... 10 2005 011 180

(51) Int. Cl.
  *B32B 5/00*    (2006.01)
  *B32B 7/00*    (2006.01)
  *B42D 15/00*   (2006.01)

(52) U.S. Cl. ................ 428/98; 428/12; 281/2; 283/113; 524/409

(58) Field of Classification Search ................... 428/98, 428/13; 524/409; 281/2; 283/113
See application file for complete search history.

(56) References Cited

U.S. PATENT DOCUMENTS

| 3,316,205 | A | 4/1967 | Dien |
| 4,177,099 | A | 12/1979 | Radzwill |

(Continued)

FOREIGN PATENT DOCUMENTS

DE    44 07 547 A1    9/1995

(Continued)

OTHER PUBLICATIONS

European Patent Abstracts of Japan; Apr. 30, 1999, Somar Corp.

(Continued)

*Primary Examiner*—Brent T O'Hern
(74) *Attorney, Agent, or Firm*—Law Office of: Michael A. Sanzo, LLC

(57) ABSTRACT

The present invention relates to plastic molded bodies having two-dimensional or three-dimensional image structures produced in the interior through laser subsurface engraving. The plastic molded bodies are made of plastic materials which have a content of nanoscale metal oxides having particle sizes from 1 to 500 nm, both the plastic material and also the included metal oxide being transparent to the laser light used for producing the image structures. The plastic materials from which the molded bodies are manufactured particularly contain metal oxides having particle sizes from 5 to 100 nm at a content of 0.0001 to 0.1 weight-percent. Typical metal oxides are nanoscale indium-tin oxide or antimony-tin oxide.

21 Claims, 4 Drawing Sheets

U.S. PATENT DOCUMENTS

| | | |
|---|---|---|
| 4,381,136 A | 4/1983 | Hosch et al. |
| 4,773,913 A | 9/1988 | Krieg et al. |
| 4,786,660 A | 11/1988 | Ittman et al. |
| 4,822,973 A | 4/1989 | Fahner et al. |
| 4,826,901 A | 5/1989 | Itmann et al. |
| 4,881,402 A | 11/1989 | Markert et al. |
| 4,957,987 A | 9/1990 | Krieg et al. |
| 5,206,496 A | 4/1993 | Clement et al. |
| 5,266,253 A | 11/1993 | Dijkhuizen et al. |
| 5,350,448 A | 9/1994 | Dietz et al. |
| 5,445,871 A | 8/1995 | Murase et al. |
| 5,449,727 A | 9/1995 | Krieg et al. |
| 5,504,133 A | 4/1996 | Murouchi et al. |
| 5,629,404 A | 5/1997 | Smith et al. |
| 5,654,090 A | 8/1997 | Kayanoki |
| 5,684,120 A | 11/1997 | Torre |
| 5,690,872 A | 11/1997 | Krieg et al. |
| 5,696,202 A | 12/1997 | Torre |
| 5,716,553 A | 2/1998 | Bergmann et al. |
| 5,756,211 A | 5/1998 | Ittmann et al. |
| 5,761,111 A | 6/1998 | Glezer |
| 5,773,558 A | 6/1998 | Torre |
| 5,830,568 A | 11/1998 | Kondo |
| 5,834,549 A | 11/1998 | Suezaki et al. |
| 5,880,235 A | 3/1999 | Schwind et al. |
| 5,882,560 A | 3/1999 | Ittmann et al. |
| 5,886,087 A | 3/1999 | Torre |
| 6,008,288 A | 12/1999 | Torre |
| 6,214,917 B1 | 4/2001 | Linzmeier et al. |
| 6,221,144 B1 | 4/2001 | Dietz et al. |
| 6,277,911 B1 | 8/2001 | Torre |
| 6,407,182 B1 | 6/2002 | Maul et al. |
| 6,521,688 B1 | 2/2003 | Linzmeier et al. |
| 6,537,479 B1 | 3/2003 | Colea |
| 6,624,226 B1 | 9/2003 | Servaty et al. |
| 6,663,683 B2 | 12/2003 | Lortz et al. |
| 6,676,719 B2 | 1/2004 | Lortz et al. |
| 6,767,377 B2 | 7/2004 | Schumacher et al. |
| 6,903,153 B2 | 6/2005 | Wessels et al. |
| 6,991,190 B2 | 1/2006 | Lortz et al. |
| 7,015,270 B2 | 3/2006 | Scharfe et al. |
| 7,046,903 B2 | 5/2006 | Schmidt et al. |
| 7,052,161 B2 | 5/2006 | Lichtenstein |
| 7,060,737 B2 | 6/2006 | Yamaguchi et al. |
| 7,074,351 B2 | 7/2006 | Döbler et al. |
| 7,169,322 B2 | 1/2007 | Lortz et al. |
| 7,187,396 B2 | 3/2007 | Carroll et al. |
| 7,288,585 B2 | 10/2007 | Moad et al. |
| 2001/0036437 A1 | 11/2001 | Gutsch et al. |
| 2002/0077380 A1 | 6/2002 | Wessels et al. |
| 2002/0086926 A1 | 7/2002 | Fisher |
| 2002/0176804 A1 | 11/2002 | Strand |
| 2003/0012405 A1 | 1/2003 | Hatta et al. |
| 2003/0045618 A1 | 3/2003 | Koshida et al. |
| 2003/0054160 A1 | 3/2003 | Fisher et al. |
| 2003/0099798 A1 | 5/2003 | George et al. |
| 2003/0108734 A1 | 6/2003 | Yano et al. |
| 2003/0124051 A1 | 7/2003 | Servaty et al. |
| 2003/0130381 A1 | 7/2003 | Joachimi et al. |
| 2003/0165680 A1 | 9/2003 | Brady et al. |
| 2003/0206854 A1 | 11/2003 | Gutsch et al. |
| 2004/0030384 A1 | 2/2004 | Wissman |
| 2004/0106697 A1 | 6/2004 | Lortz et al. |
| 2004/0157972 A1 | 8/2004 | Yamaguchi et al. |
| 2004/0191485 A1 | 9/2004 | Groothues et al. |
| 2004/0209031 A1 | 10/2004 | Kawase et al. |
| 2004/0213989 A1 | 10/2004 | Hasskerl |
| 2005/0001419 A1* | 1/2005 | Levy et al. ............ 281/2 |
| 2005/0124761 A1 | 6/2005 | Schultes et al. |
| 2005/0137305 A1* | 6/2005 | Carroll et al. ......... 524/409 |
| 2005/0169861 A1 | 8/2005 | Lortz et al. |
| 2005/0224749 A1 | 10/2005 | Lortz et al. |
| 2005/0288416 A1 | 12/2005 | Lichtenstein et al. |
| 2006/0052515 A1 | 3/2006 | Hoess et al. |
| 2006/0084723 A1 | 4/2006 | Hartwig et al. |
| 2006/0104881 A1 | 5/2006 | Lortz et al. |
| 2006/0121248 A1 | 6/2006 | Lorenz et al. |
| 2006/0163533 A1 | 7/2006 | Batz-Sohn et al. |
| 2006/0175735 A1 | 8/2006 | Hoess et al. |
| 2006/0216441 A1 | 9/2006 | Schubel et al. |
| 2006/0281846 A1 | 12/2006 | Hager et al. |
| 2007/0003779 A1 | 1/2007 | Katusic et al. |
| 2007/0056684 A1 | 3/2007 | Yamamoto et al. |
| 2007/0145327 A1 | 6/2007 | Lortz et al. |
| 2007/0173581 A1 | 7/2007 | Hager et al. |
| 2007/0175362 A1 | 8/2007 | Gutsch et al. |

FOREIGN PATENT DOCUMENTS

| | | |
|---|---|---|
| DE | 100 22 037 A1 | 11/2001 |
| DE | 100 54 859 | 5/2002 |
| DE | 10 2004 008 202 | 2/2004 |
| DE | 20 2004 003 362 U1 | 6/2004 |
| DE | 103 11 645 A1 | 9/2004 |
| EP | 0 159 529 A | 10/1985 |
| EP | 1 142 830 A1 | 10/2001 |
| EP | 1 270 511 A1 | 1/2003 |
| JP | 10016390 | 1/1998 |
| JP | 2001233976 | 8/2001 |
| JP | 2003-246132 | 9/2003 |
| WO | WO02/060988 | 8/2002 |
| WO | WO02/096982 | 12/2002 |
| WO | WO 2005/047009 | 5/2005 |
| WO | WO 2005/084955 A1 | 9/2005 |
| WO | WO2006/048089 A1 | 5/2006 |
| WO | WO 2006/048089 A1 | 5/2006 |
| WO | WO2006/058689 | 6/2006 |
| WO | WO2006/072496 | 7/2006 |
| WO | WO2006/087248 | 8/2006 |
| WO | WO2006/108743 | 10/2006 |
| WO | WO2006/111302 | 10/2006 |

OTHER PUBLICATIONS

English abstract for DE 44 07 547, reference B1 cited above.
English abstract for DE 100 54 859, reference B2 cited above.
English abstract for DE 10 2004 008 202, reference B3 cited above.
English abstract for WO2006/072496, reference B6 cited above.
English abstract for WO2006/087248, reference B7 cited above.
English abstract for WO2006/111302, reference B9 cited above.
English language translation of JP 10016390, listed as reference B1 above.
English language translation of JP 2001233976, listed as reference B2 above.
English language abstract for JP 10016390, listed as reference B1 above.
English language abstract for JP 2001233976, listed as reference B2 above.
Screenshot of Sigma Aldrich's website showing the current prices of nanoparticle sized indium-tin oxide. Screenshot taken Friday, Mar. 28, 2008.
English language computer translation of DE 20 2004 003 362 U1, cited as document B1 above.
English language computer translation of JP 2003-246132, cited as document B2 above.
Ma, et al., "New Developments in Particle Characterization by Laser Diffraction: Size and Shape," *Powder Technology* 111:66-78 (2000).
International Search Report for PCT/EP2006/060035, published Sep. 14, 2006.
English translation of Written Opinion for PCT/EP2006/060035, available online Sep. 11, 2007.
International Preliminary Examination Report for PCT/EP2006/060035, available online Sep. 12, 2007.

* cited by examiner

PLASTIC MOLDED BODIES HAVING TWO-DIMENSIONAL AND THREE-DIMENSIONAL IMAGE STRUCTURES PRODUCED THROUGH LASER SUBSURFACE ENGRAVING

CROSS REFERENCE TO RELATED APPLICATIONS

The present application claims priority to German Application No. 10 2005 011 180.7, filed Mar. 9, 2005, and to U.S. provisional application 60/705,500, filed on Aug. 5, 2005. The content of these prior applications is incorporated in its entirety herein by reference.

FIELD OF THE INVENTION

The present invention relates to plastic molded bodies having two-dimensional or three-dimensional image structures produced in the interior through laser subsurface engraving. The plastic molded bodies are made of plastic materials which have a content of nanoscale metal oxides having particle sizes from 1 to 500 nm. Both the plastic material and the included metal oxide are transparent to the laser light used for producing the image structures.

BACKGROUND

The introduction of optical information into plastic materials through laser radiation is known per se. For this purpose, one differentiates between laser marking and laser subsurface engraving.

The identification of plastic through laser marking acts on the object surface and/or in the area proximal to the surface. For this purpose, the absorption of the laser energy in the plastic material through direct interaction with the polymer or with an additive added to the plastic material, such as an organic coloring agent or an inorganic pigment, which absorbs the laser radiation, is decisive. In any case, a chemical material change and therefore a locally visible discoloration of the plastic is caused through absorption of the laser energy.

Laser-markability is a function of the wavelength-specific absorption behavior of the plastic materials and/or the polymers on which they are based, of the wavelength-specific absorption behavior of any laser-sensitive additives, and of the wavelength and radiated power of the laser radiation to be used. In addition to $CO_2$ and excimer lasers, Nd:YAG lasers (neodymium-doped yttrium-aluminum-garnet lasers), having the characteristic wavelengths of 1064 nm and 532 nm, are increasingly being used in this technology. Laser-markable plastic materials, which contain laser-sensitive additives in the form of coloring agents and/or pigments, generally have a more or less pronounced coloration and/or translucency. The molding compounds which are to be implemented as laser-absorbent are often thus equipped by introducing carbon black.

High-transparency plastic materials, which may be made laser-markable by adding nanoscale laser-absorbent metal oxides, are described in German Utility Model 20 2004 003362.3 and in German Patent Application 10 2004 010504.9, which has not previously been published. The publications DE 44 07 547 and U.S. Pat. No. 5,206,496 are cited as examples of the technology of subsurface engraving of glasses and plastics transparent to laser radiation by laser beams. (All of these references are hereby incorporated by reference in their entirety.) In contrast to laser marking, laser subsurface engraving acts at any arbitrary depth of the material. This requires that the material be essentially transparent to the incident laser radiation, since this would otherwise be absorbed in the surface region.

During the focusing of a laser beam of sufficiently high power density in the interior of the material, which is transparent to laser light per se, there is a limited development of thermal energy in the laser focus because of optical effects. This heat development results in local, narrowly limited microcrack formation in the material. Microcracks of this type have a point diameter of 25-40 µm. In glasses and plastics which are transparent in visible light, the microcracks appear as bright points because of the scattering of the daylight at the crack edges.

Through the deflection of the laser radiation via mirrors and the movement of the workpiece and through synchronization between the movement sequence and the laser pulses, corresponding structures made of individual microcracks may be assembled in the workpiece. The pulse sequence frequency of the laser typically used for this purpose allows the production of structures having up to approximately 1000 points per minute. The starting point is a 3-D illustration of the later motif in a CAD program. The surface or the entire structure of the model is resolved as a point cloud by a computer, whose individual points are implemented as microcracks in the glass or plastic by the laser beam. The denser the point cloud through which the object is illustrated, the more precise and cleaner will the model be imaged.

During the laser subsurface engraving of plastics using laser light to which the plastic is transparent, marking in the interior of the material in the form of microcracks is produced through corresponding focusing of the laser beam. Uncontrolled crack formation and crack propagation may occur in this case. This represents a weakening of the material. Keeping this weakening as small as possible is desirable.

In glass, crack formation may result in later destruction of the molded body, which sometimes only occurs days or even weeks after the laser subsurface engraving. In plastics, in addition to crack formation, local destruction of the material and carbonization may occur, which is undesirable in the subsurface engraving of material transparent in visible light because of the dark discoloration. A further problem of laser subsurface engraving using methods and materials according to the related art is the inadequate imaging precision of detailed, filigree patterns, both in glass and in plastics. Theoretically, the imaging precision may be improved by increasing the point cloud density. However, at a certain density, the points run into one another due to uncontrolled crack propagation and are no longer resolved, so that the imaging precision even suffers.

A method for crack-free laser subsurface engraving through laser pulses in the femtosecond range is described in U.S. Pat. No. 5,761,111. However, lasers suitable for this purpose are not yet widely available for technical use and would be very expensive.

In U.S. Pat. No. 6,537,479, the problem of crack formation is avoided in that the laser marking is performed in the plasticized state of the material and the object is either left in this state (enclosed by a solid protective envelope) or subsequently hardened. This method is very complex and additionally, in the case of subsequent hardening, is restricted to materials which do not display shrinkage upon hardening, since otherwise the filigree geometry of the laser engraving would be destroyed. This method has limited use and is very time-consuming.

SUMMARY OF THE INVENTION

The present invention is based on the objective of finding and providing plastic materials, in which two-dimensional or three-dimensional image structures may be produced with significantly improved imaging precision using laser subsurface engraving while avoiding uncontrolled crack formation and crack propagation. Commercially available laser sources which are typically found in technical use may be employed for this purpose.

Surprisingly, it has been found that in the interior of plastic molded bodies which are made of plastic materials that have a content of nanoscale metal oxides having particle sizes from 1 to 500 nm, three-dimensional image structures of extreme fineness and detail may be produced using laser subsurface engraving if both the plastic material and the included metal oxide are transparent to the laser light used to produce the image.

The object of the present invention is therefore plastic molded bodies having two-dimensional or three-dimensional image structures produced in the interior through laser subsurface engraving, which are distinguished in that the plastic molded bodies are made of plastic materials with metal oxides having particle sizes from 1 to 500 nm, and both the plastic material and the metal oxide are transparent to the laser light used produce the image structures.

In addition the present invention encompasses methods for producing two-dimensional or three-dimensional image structures in the interior of plastic molded bodies through laser subsurface engraving, in which molded bodies made of plastic materials having nanoscale metal oxides with particle sizes from 1 to 500 nm are irradiated with laser light to which both the plastic material and the metal oxides are transparent.

BRIEF DESCRIPTION OF THE DRAWINGS

FIG. 1 shows the results obtained using the materials and methods described in Example 1. A clear line pattern was produced in the polymer material doped with ITO.

FIG. 2 shows the results obtained using the undoped polymer material as described in Example 2. Compared to FIG. 1, a line structure can only be recognized with difficulty.

FIG. 3 shows a result obtained using the material from Example 1. Each individual point in the letters may be recognized clearly.

FIG. 4 shows a result obtained with the undoped polymer material from Example 2. The letter "a" is interspersed with cracks here and the edge only appears fuzzily.

In FIG. 5 (material from Example 1), the point cloud pattern may be recognized with high imaging precision A very fuzzy line pattern is obtained in lead crystal glass.

FIG. 6 shows the result of subsurface engraving in lead crystal glass (identical point cloud file as in FIG. 5).

FIG. 7 shows the side view of the letter "S" from FIG. 5 (material from Example 1).

FIG. 8 shows the identical image structure as FIG. 7 in the lead crystal block. The approximately 10 lines are significantly wider and more strongly offset than the lines in FIG. 7.

DETAILED DESCRIPTION OF THE INVENTION

Figure 1:
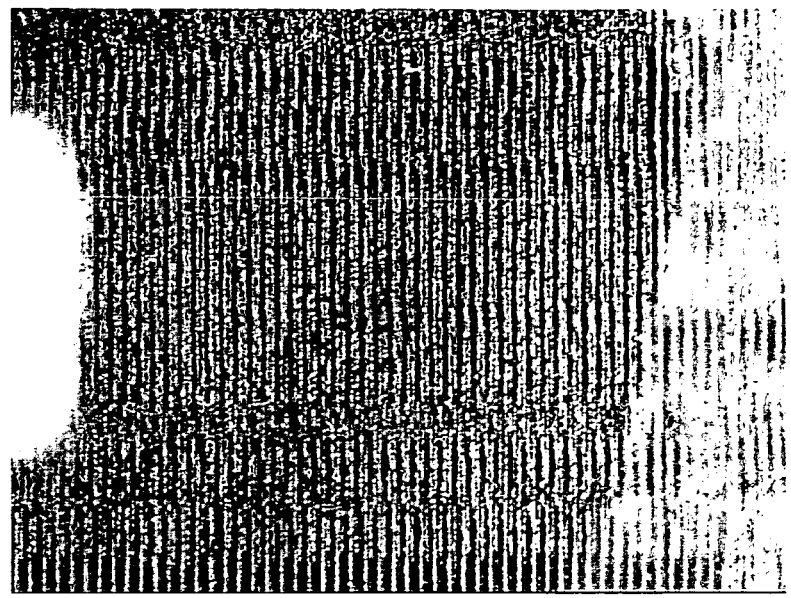
FIG. 1.

Transparent plastic materials are to be understood as those which are essentially transparent in a wavelength range from 300 to 1300 nm. The visible wavelength range of 400 to 800 nm is preferred for certain uses. Corresponding materials are particularly suitable for introducing visually perceivable structures through laser subsurface engraving, in the form of art objects, for example.

In addition, plastic materials having laser transparency in the wavelength range from 800 to 1300 nm are preferred for other uses. Corresponding materials, which visually may appear colored and/or opaque or entirely nontransparent, are suitable for introducing structures which are not visually perceivable through laser subsurface engraving, such as barcodes or data matrix codes for security purposes, for example.

The transmission of the plastic material in the selected wavelength range of commercially available laser sources typically found in technical use is to be greater than 80%, preferably greater than 85%, and especially preferably greater than 90%. The haze in the wavelength range from 400 to 800 nm is to be less than 5, preferably less than 2, and particularly less than 1%. Transmission and haze are determined in accordance with ASTM D 1003.

Nanoscale metal oxides are to be understood as all inorganic metallic oxides, such as metal oxides, mixed metal oxides, complex oxides, and mixtures thereof, which cause no or only slight absorption in the characteristic wavelength range of the laser to be used. Overall, it must be strictly ensured that both the transparent plastic molded body and also the nanoscale metal oxide are transparent to the laser light to be used.

Nanoscale is to be understood as meaning that the largest dimension of the discrete particles of these laser-sensitive metal oxides is less than 1 μm, i.e., is in the nanometer range. In this case, this size definition relates to all possible particle morphologies, such as primary particles and also aggregates and agglomerates. The particle size of the laser-sensitive metal oxides is preferably 1 to 500 nm and particularly 5 to 100 nm. If the particle size is selected below 100 nm, the metal oxide particles are no longer visible per se and do not impair the transparency of the plastic matrix.

In the plastic material, the content of inorganic nanoparticles is advantageously 0.0001 to 0.1 weight-percent, preferably 0.0005 to 0.05 weight-percent, and especially preferably 0.001 to 0.01 weight-percent, in relation to plastic material. Controlled crack formation and therefore visible subsurface marking with high imaging precision is typically produced in this concentration range for all relevant plastic materials. With suitable selection of particle size and concentration in the specified ranges, even with matrix materials which are highly transparent in the visible wavelength range, impairment of the intrinsic transparency is excluded. It is thus advantageous for nanoparticles having particle sizes above 100 nm to be in the lower concentration range, while particles with sizes below 100 nm, may also be used at higher concentrations.

Preferably, doped indium oxide, doped tin oxide, doped zinc oxide, doped aluminum oxide, doped antimony oxide, and corresponding mixed oxides are used as the inorganic nanoparticles for manufacturing plastic materials which may be subsurface-marked by lasers. Nanoparticles having particle sizes of less than 100 nm are also advisably used in opaque plastic materials which are to be irradiated in the wavelength range between 800 and 1300 nm to produce images, since this produces a homogeneous distribution of the metal oxides in the polymer matrix which is important for controlled crack formation.

Especially suitable inorganic nanoparticles are indium-tin oxide (ITO) or antimony-tin oxide (ATO), as well as doped indium-tin oxide and/or antimony-tin oxide. Indium-tin oxide is especially preferred, and in turn the "blue" indium-tin oxide obtainable through a partial reduction process. The non-reduced "yellow" indium-tin oxide may cause a visually perceivable, slightly yellowish tint of the plastic material at higher concentrations and/or particle sizes in the upper range, while the "blue" indium-tin oxide does not result in any perceivable color change. However, a slight bluish color may be considered more desirable by an observer than a yellowish tint.

The inorganic nanoparticles to be used according to the present invention are well known in the art and are commercially available even in nanoscale form, i.e., having particle sizes below 1 μm, and particularly in the size range preferred here, frequently in the form of dispersions. As delivered, the inorganic nanoparticles are typically agglomerated. The agglomerates, whose particle size is between 1 μm and multiple millimeters, may be decomposed into nanoscale particles using strong shearing. The degree of agglomeration is determined as defined in DIN 53206 (of August 1972).

Nanoscale metal oxides may be manufactured through pyrolytic methods. Such methods are described, for example, in EP 1 142 830 A, EP 1 270 511 A or DE 103 11 645. Inorganic nanoparticles may also be manufactured through precipitation methods, as described in DE 100 22 037. All hereby incorporated by reference in their entirety.

The nanoscale metal oxides may be incorporated into practically all plastic systems in order to provide them with laser markability. Plastic materials in which the plastic matrix is based on poly(meth)acrylate, polyamide, polyurethane, polyolefins, styrene polymers and styrene copolymers, polycarbonate, silicones, polyimides, polysulfone, polyethersulfone, polyketones, polyether-ketones, PEEK, polyphenylensulfide, polyesters (such as PET, PEN, PBT), polymethylene oxide, polyurethane, polyolefins, or fluorinated polymers (such as PVDF, EFEP, PTFE) are typical. Incorporation into blends is also possible, which contain the above-mentioned plastics as components, or into polymers derived from these classes, which have been altered through subsequent reactions. These materials are known in manifold forms and are commercially available.

The advantage according to the present invention of the inorganic nanoparticles is particularly important in high-transparency plastic systems such as polycarbonates, transparent polyamides (such as Grilamid® TR55, TR90, Trogamid® T5000, CX7323), polyethylene terephthalate, polysulfone, polyethersulfone, cycloolefinic copolymers (Topas®, Zeonex®), polymethylmethacrylate, and their copolymers, since they do not influence the transparency of the material. This is also true with respect to transparent polystyrene and polypropylene as well as all partially crystalline plastics which may be processed into transparent molded bodies through the use of nucleation agents or special processing conditions.

The transparent polyamides according to the present invention are generally manufactured from the following components: branched and unbranched aliphatic (6 C to 14 C atoms), alkyl-substituted or unsubstituted cycloaliphatic (14 C to 22 C atoms), araliphatic diamines (C 14-C 22), and aliphatic and cycloaliphatic dicarboxylic acids (C 6 to C 44; the latter may be partially replaced by aromatic dicarboxylic acids. In particular, the transparent polyamides may additionally be composed from monomer components having 6 C atoms, 10 C atoms, 11 C atoms, and/or 12 C atoms, which are derived from lactams or ω-amino carboxylic acids.

The transparent polyamides according to the present invention are preferably, but not exclusively, manufactured from the following components: laurin lactam or ω-aminododecanoic acid, azelaic acid, sebacic acid, dodecanedioic acid, fatty acids (C18-C36; e.g., under the trade name Pripol®), cyclohexane dicarboxylic acids, and partial replacement of these aliphatic acids by isoterephthalic acid, terephthalic acid, naphthalene dicarboxylic acid, or tributylisophthalic acid. Furthermore, decane diamine, dodecane diamine, nonane diamine, hexamethylene diamine in branched, unbranched, or substituted forms are used, as well as representatives from the classes of the alkyl-substituted/unsubstituted cycloaliphatic diamines bis-(4-aminocyclohexyl)-methane, bis-(3-methyl-4-aminocyclohexyl)-methane, bis-(4-aminocyclohexyl)-propane, bis-(aminocyclohexane), bis-(aminomethyl)-cyclohexane, iso-phorone diamine or even substituted pentamethylene diamines. Examples of corresponding transparent polyamides are described, for example, in EP 0 725 100 and EP 0 725 101.

High-transparency plastic systems based on polymethylmethacrylate, bisphenol-A-polycarbonate, polyamide, and cyclo-olefinic copolymers made of norbornene and α-olefins, may be made subsurface-markable by lasers with the aid of the inorganic nanoparticles according to the present invention without impairing the transparency of the material. Of course, the nanoscale metal oxides may also be used in colored high-transparency systems. It is particularly advantageous here that the neutral intrinsic color of these additives allows a free selection of color.

The transparent plastic materials which may be structured through laser subsurface engraving according to the present invention may be provided as slabs, molded bodies, semifinished products, or molding compounds. In this case, only a part of the slabs, molded bodies, semifinished products, and molding compounds may also be implemented as able to be subsurface engraved by laser. The plastic materials which may be subsurface engraved by lasers are manufactured according to methods well known in plastic manufacturing and processing. It is possible to introduce the nanoparticle additives before or during the polymerization or polycondensation in individual starting materials or starting material mixtures or even to add them during the reaction. In the case of polycondensates such as polyamides, the additives may be incorporated into one of the monomer components, for example. This monomer component may then be subjected to a polycondensation reaction in a typical way with the remaining reaction partners. Furthermore, after formation of macromolecules, the resulting high-molecular-weight intermediate or final products may be admixed with the nanoparticle additives, using methods known to those skilled in the art.

Depending on the formulation of the plastic matrix material, liquid, semiliquid, and solid formula components or monomers and possibly required additives such as polymerization initiators, stabilizers (such as UV absorbers, heat stabilizers), optical brighteners, antistatic agents, softeners, demolding agents, lubricants, dispersing agents, and antistatic agents, but also fillers and reinforcing agents or shock resistance modifiers, etc., may be mixed and homogenized, possibly molded and then cured in devices and facilities typically used for this purpose, such as reactors, stirring vessels, mixers, roller mills, extruders, etc. The nanoscale metal oxides are introduced into the material at a suitable time and incorporated homogeneously. The incorporation of the nanoscale metal oxides in the form of a concentrated masterbatch having the same or a compatible plastic material is especially preferred.

It is advantageous if the nanoscale metal oxides are incorporated into the plastic matrix under high shear in the plastic matrix. This may be performed through appropriate setting of the mixture, rolling mill, or extruder. In this way, any possible agglomeration or aggregation of the nanoscale metal oxide particles into larger units is effectively avoided; any existing larger particles are pulverized. The corresponding technologies and the particular method parameters to be selected are commonplace to those skilled in the art.

Plastic molded bodies and semifinished products are obtainable from molding compounds through injection molding or extrusion or from the monomers and/or pre-polymers through casting methods. The polymerization is performed according to methods known to those skilled in the art, for example, by adding one or more polymerization initiators and inducing the polymerization by heating or irradiation. A tempering step may follow the polymerization for the complete reaction of the monomer(s).

After plastic molded parts are manufactured from the plastic materials containing nanoscale metal oxides, these may be marked through irradiation with laser light. The laser subsurface engraving may be performed on a commercially available laser marking device, e.g., that from Cerion (Cerion X2, compact, green 532 nm) having a writing speed of 300 to 1000 points/second, a pulse frequency of 3 kHz, and a pulse energy of 1 to 2 mJ. The molded body to be engraved is inserted into the device and, after irradiation with a focused laser beam, white to dark-gray image structures having sharp contours and high contrast are obtained. The required settings may be determined on a case by case basis. For example, the following materials may also be used as the laser crystals:
Ti:$Al_2O_3$ (wavelength settable from 680 to 1100 nm)
Yb:YAG (wavelength 1030 nm, 1st harmonic: 515 nm, 2nd harmonic: 343 nm)
Nd:YAG and Nd:Ce:Tb:YAG (wavelength 1064 nm, 1st harmonic: 532 nm, 2nd harmonic: 355 nm)
Ho:Cr:Tm:YAG (wavelength 2097 nm, 1st harmonic: 1048.5 nm, 2nd harmonic: 699 nm)
Er:YAG (wavelength 2940 nm, 1st harmonic: 1470 nm, 2nd harmonic: 980 nm)

Of course, diode lasers may also be used, which emit at wavelengths of 808, 940, and 980 nm.

The transparent plastic materials may be used very advantageously according to the present invention to manufacture plastic molded bodies having three-dimensional image structures produced under the surface through laser subsurface engraving. In addition to technical applications, art objects may also be made. The transparent polymers may also be colored. Colors which do not absorb the laser light are expediently used. The coloration may be implemented as transparent, translucent, or even muted. Especially interesting art objects are obtained if fluorescent pigments are used. By illuminating the edges of art objects of this type, art objects which are especially valuable may be manufactured.

In the following, the manufacture of nanoparticle/plastic mixtures and the performance of subsurface engraving through laser subsurface marking is exemplified on the basis of polymethylmethacrylate and polyamide systems.

EXAMPLES

Example 1

Manufacture of a Cast Polymethylmeth-Acrylate Block (PLEXIGLAS® GS) Having 100 ppm Indium-Tin Oxide A. Dispersion of indium-tin Oxide Nano®ITO IT-05 C5000 from Nanogate in PMMA Molding Compound PLEXIGLAS® 7N on a Dual-Roller Mill Polymix 110 L from Schwabenthan:

90 g PMMA molding compound PLEXIGLAS® 7N is melted on a preheated dual-roller mill. The roller temperature is 166° C. on the front roller and 148° C. on the rear roller. A further 90 g PMMA molding compound PLEXIGLAS® 7N is premixed with 20 g Nano®ITO IT-05 C5000 and applied to the rollers with approximately 5 g stearic acid. The rear roller may be rotated somewhat more rapidly and thus generates a friction. Within 6 minutes, the rolled sheet is removed from the roller, folded, and placed on the roller again 10 times. Subsequently, the rolled sheet is pulled off of the roller, cooled, and pulverized.

B. Manufacture of a Stock Solution Using the Rolled Sheet:

The following materials are weighed in a 1 l wide-neck flask:
50.0 g 10% rolled sheet (from 1)
87.5 g dispersing agent (e.g., PLEX® 8684 F from DEGUSSA AG/Rohm)
750.0 g MMA
750.0 g MMA/PMMA syrup having 25% PMMA having a molecular weight of 170000

To dissolve the rolled sheet and the polymer dispersing agent, the flask is sealed and rolled for 50 hours on a roller bench.

C. Manufacture of the Polymerization Batch:

Manufacture of the polymerization batch of 1000 g having 0.01% Nano®ITO IT-05 C5000.
34.50 g stock solution
0.80 g initiator (2,2'-azobis-(2,4-dimethylvaleronitrile)
0.20 g to 1.0 g separating agent (lecithin)
960.00 g MMA/PMMA syrup having 25% PMMA having a molecular weight of 170000

The polymerization batch is stirred for 30 minutes, left standing for 10 minutes, poured into the polymerization chamber, and then immediately placed in a water bath.

D. Polymerization in a Polymerization Chamber

A polymerization chamber of 10×200×200 mm dimensions is constructed from two 6 mm thick float glass disks, a distance cord, and several metal clamps. The polymerization chamber is placed vertically. The polymerization batch is allowed to run in slowly, and the chamber is sealed. The filled polymerization chamber is laid horizontally in the water bath, which is heated to 45 to 50° C., and left lying until the polymerization batch has polymerized into a solid compound. After removing the clamps and the distance cord, the polymerization chamber is finish-polymerized 4 hours in a tempering cabinet heated to 115° C., subsequently allowed to cool in the tempering cabinet, and removed from the mold. The light transmission in the visible range is 90% and the haze is 1%. The material is internally marked using a frequency-doubled Nd:YAG laser (emission wavelength 532 nm, power stage 3, duration 4 minutes).

Comparative Example 2

Manufacture of an Undoped Cast Polymethylmethacrylate Block (PLEXIGLAS®GS)

A method analogous to that of Example 1 is used. In this case, only method steps C and D are performed. The manufacture of a rolled sheet may be dispensed with. The appropriate quantity of stock solution from step C may be replaced by a corresponding quantity of MMA/PMMA syrup. The light transmission in the visible range is 90% and the haze is 1%. The material is internally marked using a frequency-doubled Nd:YAG laser (emission wavelength 532 nm, power stage 3, duration 4 minutes).

Example 3

Manufacture of a Polyamide/ITO Compound

Trogamid® CX 7323, a commercial product of Degussa AG, High Performance Polymers Division, Marl, is compounded and granulated with nanoscale indium-tin oxide Nano®ITO IT-05 C5000 from Nanogate at a concentration of 0.01 weight-percent on a Berstorff ZE 2533 D extruder at 300° C. Slabs having the dimensions 10×100×100 mm are manufactured from the granulate in the injection molding method. The light transmission in the visible range is 90% and the haze is 1.5%. The material is internally marked using a frequency-doubled Nd:YAG laser (emission wavelength 532 nm, power stage 4, duration 1 minute).

Comparative Example 4

Manufacture of Undoped Polyamide Slabs

Slabs having the dimensions 10×100×100 mm are manufactured from Trogamid® CX 7323, a commercial product of Degussa AG, High Performance Polymers Division, Marl, using an injection molding method. The light transmission in the visible range is 90% and the haze is 1.5%. The material is internally marked using a frequency-doubled Nd:YAG laser (emission wavelength 532 nm, power stage 4, duration 1 minute).

Example 5

Results of the Laser Deep Marking on PMMA Compounds

The following images were produced from molded bodies internally engraved using a frequency-doubled Nd:YAG laser (emission wavelength 532 nm):

FIG. 1 shows the result obtained with the material from Example 1. A clear line pattern was produced in the polymer material doped with ITO.

Figure 2:
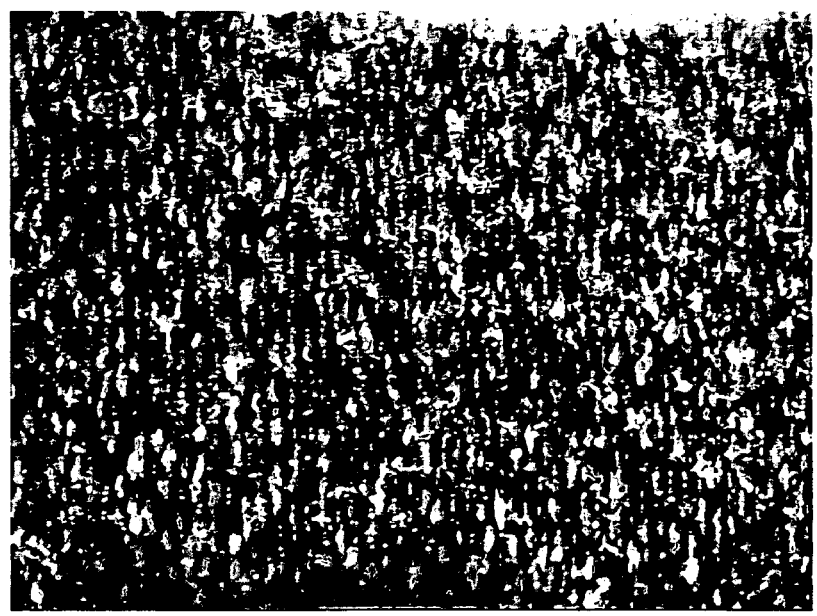
FIG. 2.

FIG. 2 shows the result obtained with the undoped polymer material from Example 2. A line structure may only be recognized with difficulty. The differences in the imaging precision may be seen clearly. Significantly better imaging precision may also be recognized in the doped PMMA samples in the writing of letters.

Figure 3:
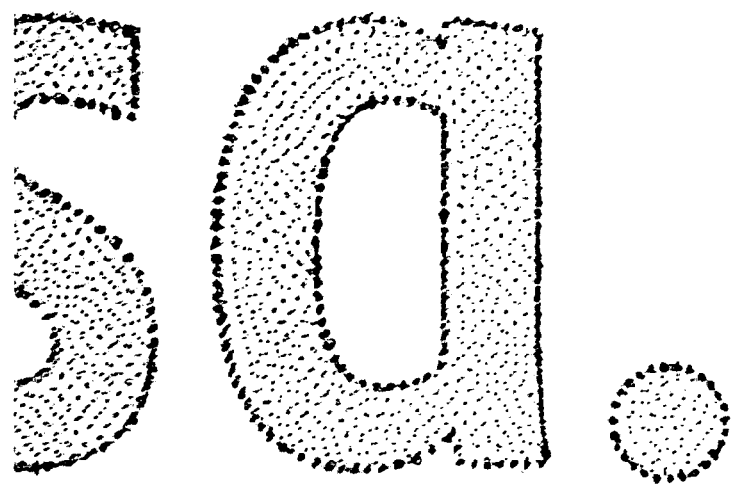
FIG. 3.

FIG. 3 shows the result with the material from Example 1. In the doped material, each individual point in the letters may be recognized clearly. All points are separated from one another. The points do not flow into one another due to uncontrolled crack formation.

Figure 4:
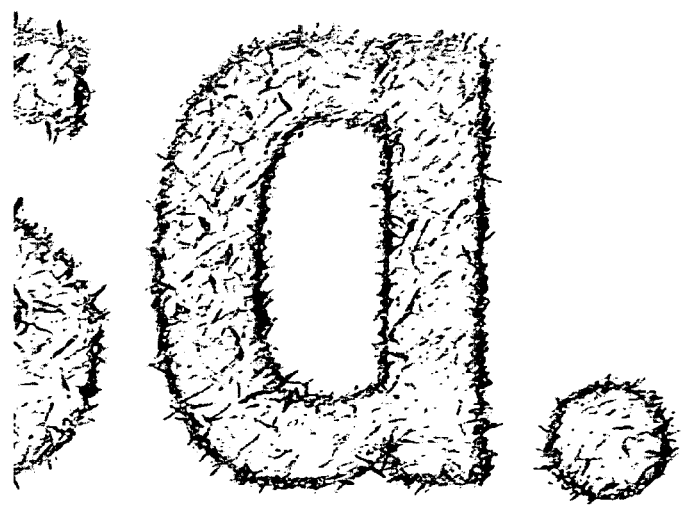
FIG. 4.

FIG. 4 shows the result with the undoped polymer material from Example 2. The letter "a" is interspersed with cracks here and the edge only appears fuzzily.

Figure 5:
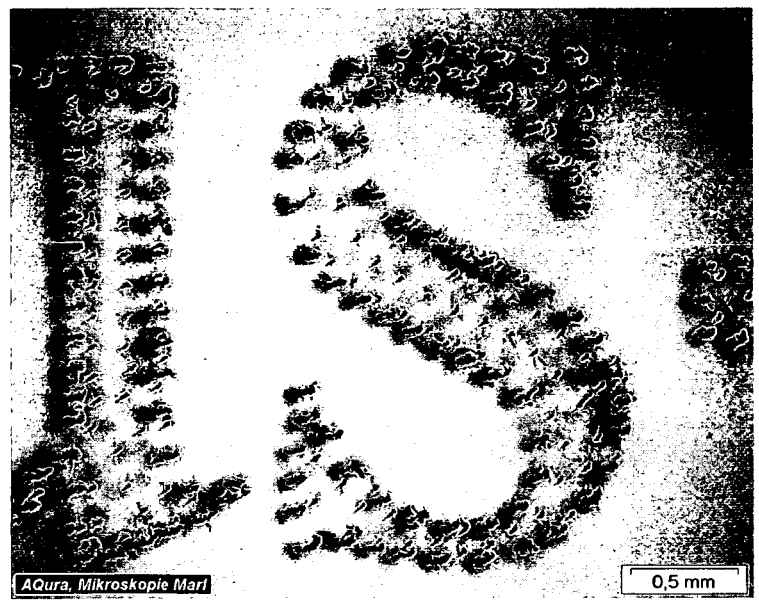
FIG. 5.
Figure 6:
FIG. 6.

The superiority of the imaging precision of doped PMMA for laser subsurface engraving is also clearly visible in comparison to lead crystal glass, which is typically used for manufacturing art objects through laser subsurface engraving. While in FIG. 5 (material from Example 1), the point cloud pattern may be recognized with high imaging precision, a very fuzzy line pattern is obtained in lead crystal glass. FIG. 6 shows the result of subsurface engraving in lead crystal glass (identical point cloud file as in FIG. 5).

Figure 7:
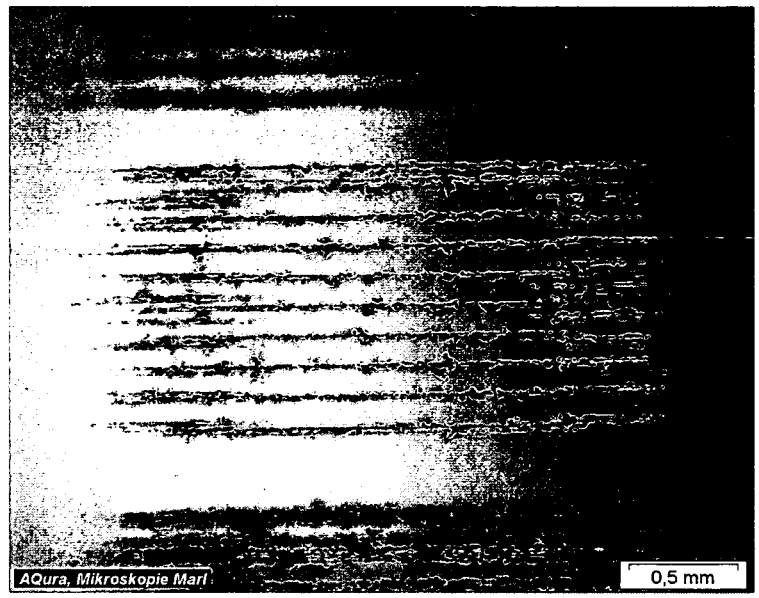
FIG. 7.
Figure 8:
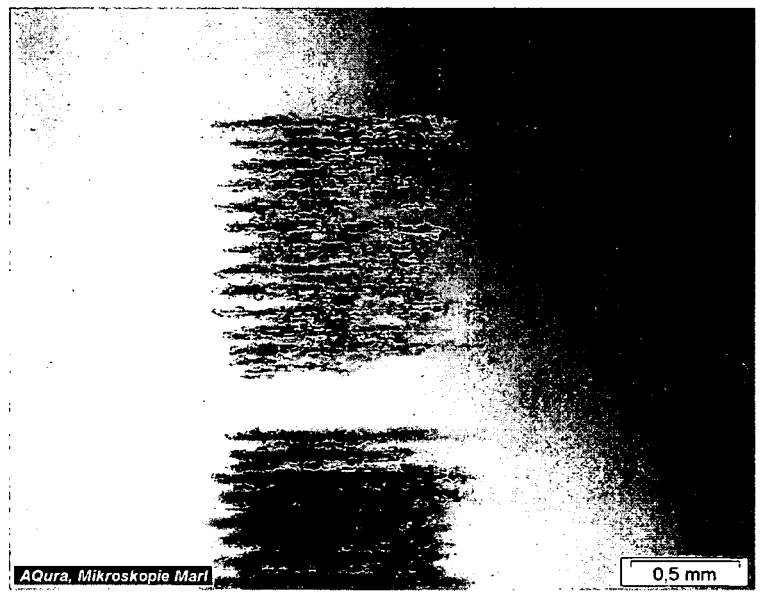
FIG. 8.

The outstanding imaging precision of doped PMMA is also observed in the third dimension. FIG. 7 shows the side view of the letter "S" from FIG. 5 (material from Example 1). A line pattern made of approximately 10 lines, which are completely separated from one another, may be observed. FIG. 8 shows the identical image structure in the lead crystal block. The approximately 10 lines are significantly wider and more strongly offset than the lines in FIG. 7.

All references cited herein are fully incorporated by reference. Having now fully described the invention. It will be understood by one of skill in the art that the invention may be performed within a wide and equivalent range of conditions, parameters and the like, without affecting the spirit or scope of the invention or any embodiment thereof.

What is claimed is:

1. A plastic molded body comprising a two-dimensional or three-dimensional image structure made of microcracks in its interior under a surface and said mocrocracks have a point diameter of 25-40 µm, wherein said plastic molded body comprises a plastic material and nanoscale metal oxides with particle sizes from 1 to 500 nm, and wherein both the plastic material and the metal oxides are transparent to laser light with a wavelength of 300-1300 nm.

2. The plastic molded body according of claim 1, wherein the particle size of said metal oxides is 5 to 100 nm.

3. The plastic molded body of claim 1, wherein said two dimensional or three-dimensional image is formed by laser light at a wavelength of 300-1300 nm.

4. The plastic molded body of claim 1, wherein the content of said metal oxides is 0.001 to 0.01 weight-percent, relative to said plastic material.

5. The plastic molded body of claim 1, wherein said nanoscale metal oxides are selected from the group consisting of: doped indium oxide; doped tin oxide; doped zinc oxide; doped aluminum oxide; and doped antimony oxide.

6. The plastic molded body of claim 1, wherein said nanoscale metal oxides are selected from the group consisting of: indium-tin oxide; antimony-tin oxide; doped indium-tin oxide; and doped antimony-tin oxide.

7. The plastic molded body of claim 1, wherein said nanoscale metal oxide is blue indium-tin oxide.

8. The plastic molded body of claim 1, wherein said plastic material is selected from the group consisting of: poly(meth) acrylate; polyamide; polyurethane; polyolefins; styrene polymers and styrene copolymers; polycarbonate; silicones; polyimides; polysulfone; polyethersulfone; polyketones; polyether-ketones; polyphenylene sulfide; polyesters; polyethylene oxide; polyurethane; polyolefins; and chlorinated or fluorinated polymers.

9. The plastic molded body of claim 1, wherein said plastic material is polymethylmethacrylate.

10. The plastic molded body of claim 1, wherein said plastic material is bisphenol-A-polycarbonate.

11. The plastic molded body of claim 1, wherein said plastic material is a polyamide.

12. The plastic molded body of claim 1, wherein said plastic material is a cycloolefinic copolymer made of norbornene and α-olefins.

13. The plastic molded body of claim 1, wherein both said plastic material and said metal oxides are transparent to laser light with a wavelength of 400-800 nm.

14. The plastic molded body of claim 1, wherein both said plastic material and said metal oxides are transparent to laser light with a wavelength of 800 to 1300 nm.

15. The plastic molded body of claim 1, wherein;
   a) said nanoscale metal oxides are selected from the group consisting of: doped indium oxide; doped tin oxide; doped zinc oxide; doped aluminum oxide; and doped antimony oxide;
   b) said plastic material is selected from the group consisting of: poly(meth)acrylate; polyamide; polyurethane;

polyolefins; styrene polymers and styrene copolymers; polycarbonate; silicones; polyimides; polysulfone; polyethersulfone; polyketones; polyether-ketones; polyphenylene sulfide; polyesters; polyethylene oxide; polyurethane; polyolefins; and chlorinated or fluorinated polymers; and c) the content of said metal oxides in said plastic molded body is 0.001 to 0.01 weight-percent, relative to said plastic material.

16. The plastic molded body of claim 15, wherein both said plastic material and said metal oxides are transparent to laser light with a wavelength of 400-800 nm.

17. The plastic molded body of claim 15, wherein both said plastic material and said metal oxides are transparent to laser light with a wavelength of 800 to 1300 nm.

18. The plastic molded body of claim 1, wherein all of said metal oxides are transparent to laser light with a wavelength of 300-1300 nm.

19. The plastic molded body of claim 18, wherein said metal oxides constitute 0.001 to 0.01 weight-percent, of the composition relative to said plastic material and are selected from the group consisting of: doped indium oxide; doped tin oxide; doped zinc oxide; doped aluminum oxide; doped antimony oxide; indium-tin oxide; antimony-tin oxide; doped indium-tin oxide; and doped antimony-tin oxide.

20. The plastic molded body of claim 19, wherein said plastic material is selected from the group consisting of: poly(meth)acrylate; polyamide; polyurethane; polyolefins; styrene polymers and styrene copolymers; polycarbonate; silicones; polyimides; polysulfone; polyethersulfone; polyketones; polyether-ketones; polyphenylene sulfide; polyesters; polyethylene oxide; polyurethane; polyolefins; and chlorinated or fluorinated polymers.

21. The plastic molded body of claim 20, wherein the particle size of said metal oxides is 5 to 100 nm.

* * * * *